No. 757,884. PATENTED APR. 19, 1904.
H. P. CLAUSEN.
THERMAL CUT-OUT.
APPLICATION FILED JULY 18, 1903.
NO MODEL.
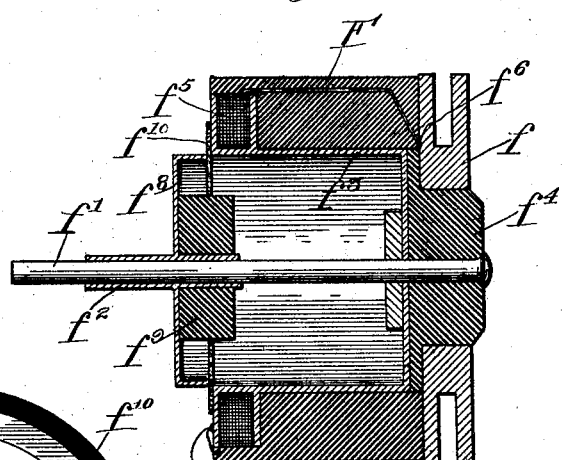
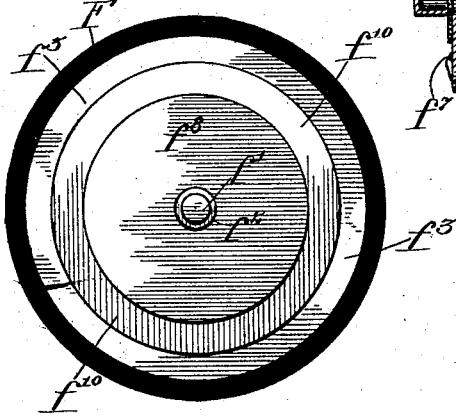
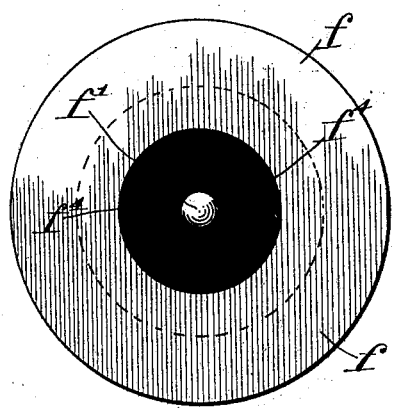
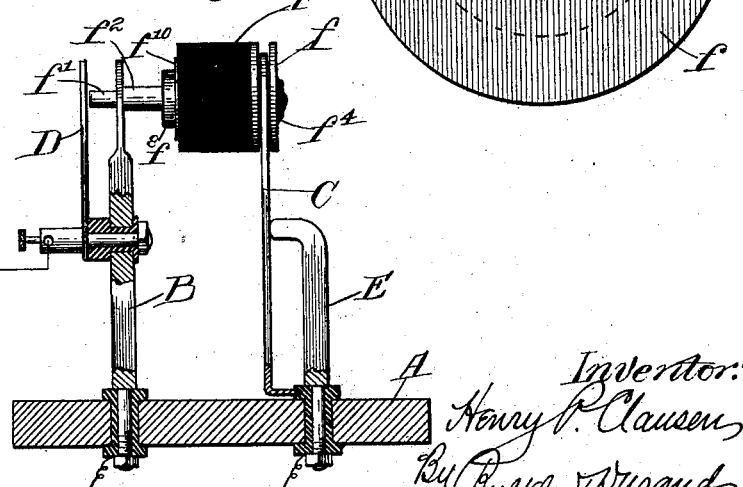
Witnesses: Inventor: Henry P. Clausen No. 757,884. Patented April 19, 1904.

UNITED STATES PATENT OFFICE.

HENRY P. CLAUSEN, OF CHICAGO, ILLINOIS, ASSIGNOR TO P. C. BURNS AND J. G. IHMSEN, OF CHICAGO, ILLINOIS.

THERMAL CUT-OUT.

SPECIFICATION forming part of Letters Patent No. 757,884, dated April 19, 1904.

Application filed July 18, 1903. Serial No. 166,198. (No model.)

*To all whom it may concern:*

Be it known that I, HENRY P. CLAUSEN, a citizen of the United States of America, and a resident of Chicago, Cook county, Illinois, have invented a certain new and useful Improvement in Thermal Cut-Outs, of which the following is a specification.

My invention relates to a type of thermal cut-out in which a mass of solder or other fusible material is employed for keeping the circuit normally closed and in which a coil of wire or other suitable heat-concentrating member is arranged to melt or fuse the said solder or other fusible material upon the passage of an abnormally strong current, it being also usually desirable to provide means for connecting the line-circuit with ground simultaneously with the opening of such circuit.

Generally stated, the object of my invention is to provide an improved and highly efficient thermal cut-out of the foregoing character.

A special object is to provide a construction and arrangement whereby the solder or other fusible material will be subjected to a shearing action when it softens or partially melts, so as to render the cut-out more responsive and quicker in action. Prior to my invention thermal cut-outs have usually been constructed in such manner that it was usually necessary to mash or flatten the entire mass of solder, sever the mass of solder by a direct or tensile strain, or to break the connection in some similar way, and in each case it is obvious that a complete melting down or softening of the solder is necessary. With my improved arrangement, however, in which a thin sheet of solder is interposed between two sharp-edged members which tend normally to produce a shearing action and which then do effect a shearing action as soon as the sheet of solder becomes slightly softened or partially melted, it will be readily seen that a much quicker and more responsive device is provided and that as a consequence the circuit is opened before the trespassing current can do any harm.

To the foregoing and other useful ends my invention consists in matters hereinafter set forth and claimed.

In the accompanying drawings, Figure 1 is an enlarged longitudinal section of an improved heat-coil which constitutes a part of my improved thermal cut-out. Fig. 2 is an end elevation of the heat-coil shown in Fig. 1. Fig. 3 is a view of the other end of said heat-coil. Fig. 4 is a view, partly in section and partly in side elevation, of my improved thermal cut-out with the said heat-coil mounted in place and ready for action.

As thus illustrated my improved thermal cut-out comprises a suitable base A, a post B and a spring C, mounted on said base and insulated therefrom, and a couple of insulated contacts D and E. The contact D can be mounted on the post B, as shown, while the contact E can be mounted on the base and insulated from the spring C. The contact E, however, normally engages the spring C. The heat-coil F, to which my invention more particularly relates, is preferably formed with a spool-shaped head $f$, adapted to engage the notched upper end of the spring C, and with a pin $f'$, adapted to project through an opening in the post B. The sleeve $f^2$ constitutes a shoulder adapted to bear against the post B for the purpose of normally preventing the spring C from forcing the end of the pin $f'$ into engagement with the contact-spring D.

The internal construction of the heat-coil, as shown in Fig. 1, comprises a frame $f^3$, which is rigid with the pin $f'$ and also electrically connected therewith, but which is insulated from the head $f$ by means of a hub-like piece of insulation $f^4$. A heating-coil or coil of high resistance $f^5$ encircles the said frame $f^3$, one terminal, $f^6$, of this heat-coil being preferably soldered to the head $f$ and the other terminal, $f^7$, being preferably soldered to the frame $f^3$. A telescoping member $f^8$ is slidingly mounted on the pin $f'$ and is preferably provided with a hub-like piece of insulation $f^9$. The sleeve $f^2$, previously referred to, is preferably rigid or integral with the said sliding member $f^8$. The frame $f^3$ and the telescoping or sliding member $f^8$ are normally prevented from telescoping one within the other by an interposed sheet of solder or other suitable fusible material $f^{10}$. This sheet of solder can, if desired, be in the form of a flat ring adapted to fit upon the hub $f^9$ of insulation. When the heat-coil is adjusted in place, the opposing edges of the cylindric frame $f^3$ and the sliding member $f^8$ normally subject the sheet of solder $f^{10}$ to a shearing pressure or action—that is to say, the pressure of the spring C tends normally to exert a shearing pressure or action on the said solder. Such being the case it will be seen that when a trespassing or abnormally strong current traverses the circuit, thereby passing from the post B, through the pin $f'$, thence through the frame $f^3$ to the heat-coil $f^5$, thence through the metallic head $f$ and the spring C, this normal tendency to produce a shearing action is then developed into a positive or actual shearing of the solder, for the heat generated by the heat-coil will be sufficient to soften or partially melt the solder, and the pressure of the spring C is then sufficient to cause the telescoping members $f^3$ and $f^8$ to telescope one within the other, thereby shearing or cutting the sheet or ring-like piece of solder in two. The smaller or inner ring portion of the solder will be carried forward by the member $f^8$, while the outer or larger ring portion of the solder will be pushed outward and will fall down upon and encircle the sleeve $f^2$.

Thus it will be seen that a very thin sheet of solder can be employed as a means for holding the parts in their normal positions and that consequently a quick and effective shearing action is produced as soon as the solder softens or partially melts, with the result that the device as a whole is of a very responsive and efficient character. There is absolutely no danger of the melted solder impeding or interfering with the desired movement of the parts for the purpose of opening the circuit.

What I claim as my invention is—

1. A thermal cut-out comprising a heat-concentrating member, softenable material associated with said member and adapted to be softened by the heat thereof, coacting members bearing upon opposite sides of said softenable material, and means including a spring for causing the said coacting members to shear the softenable material upon the passage of an abnormally strong current and the consequent softening of said material, the said softenable material being removably interposed between the opposing edges of said members.

2. A thermal cut-out comprising a heat-concentrating member, suitable softenable material, and means including a pair of telescoping members and a spring for shearing said material upon the passage of an abnormally strong current and the consequent softening of said material, said softenable material being interposed between the opposing ends of said members.

3. A thermal cut-out comprising a heat-concentrating member, a body of softenable material, and means including relatively sliding members and a spring for shearing said material upon the passage of an abnormally strong current and the consequent softening of said material, the said softenable material being removably interposed between the opposing edges of said members.

4. A thermal cut-out comprising a suitable heating-coil, a thin sheet of softenable material, and means including a pair of sharp-edged telescoping members and a spring for shearing said sheet of softenable material upon the passage of an abnormally strong current and the consequent softening of said material, said softenable material being interposed between the opposing ends of said members.

5. A thermal cut-out comprising means for maintaining the electrical continuity of a circuit and for opening said circuit upon the passage of an abnormally strong current, said means including a heat-coil and a suitable spring, and including also a small thin removable ring of solder positioned in place to normally hold said spring under tension, but adapted when softened by the heat of said coil to release said spring.

6. A thermal cut-out comprising a member, softenable material engaging said member, a shearing member having a cutting edge bearing normally against said softenable material, a high resistance associated with said softenable material, and a spring normally exerting its tension through said shearing member on the softenable material.

7. A thermal protector comprising a support, a thin ring of solder on said support, a shearing member adapted to telescope over said support and provided with a circular cutting edge bearing normally against said solder, a heating member associated with said solder, and a spring normally exerting its tension through said shearing member on the solder.

8. A thermal cut-out, comprising a body of softenable material, a pair of shearing members held normally against relative movement by said material, a resistance associated with said material, and a spring acting to shear said material upon the passage of sufficient current through said resistance and the consequent softening of said material.

Signed by me at Chicago, Cook county, Illinois, this 9th day of July, 1903.

HENRY P. CLAUSEN.

Witnesses:
D. R. HOFFMAN,
M. THOMAS.